(12) United States Patent
Shieh et al.

(10) Patent No.: US 10,193,929 B2
(45) Date of Patent: Jan. 29, 2019

(54) METHODS AND SYSTEMS FOR IMPROVING ANALYTICS IN DISTRIBUTED NETWORKS

(71) Applicant: vArmour Networks, Inc., Mountain View, CA (US)

(72) Inventors: Choung-Yaw Shieh, Palo Alto, CA (US); Tony Wing Fai Chou, San Jose, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 14/657,210

(22) Filed: Mar. 13, 2015

(65) Prior Publication Data

US 2016/0269442 A1 Sep. 15, 2016

(51) Int. Cl.
*G06F 21/00* (2013.01)
*H04L 29/06* (2006.01)

(52) U.S. Cl.
CPC .......... *H04L 63/20* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 6,253,321 B1 | 6/2001 | Nikander et al. | |
| 6,484,261 B1 * | 11/2002 | Wiegel | H04L 41/0856 715/763 |
| 6,578,076 B1 | 6/2003 | Putzolu | |
| 6,765,864 B1 | 7/2004 | Natarajan et al. | |
| 6,970,459 B1 | 11/2005 | Meier | |
| 6,981,155 B1 | 12/2005 | Lyle et al. | |
| 7,028,179 B2 | 4/2006 | Anderson et al. | |
| 7,058,712 B1 | 6/2006 | Vasko et al. | |
| 7,062,566 B2 | 6/2006 | Amara et al. | |
| 7,096,260 B1 | 8/2006 | Zavalkovsky et al. | |
| 7,373,524 B2 | 5/2008 | Motsinger et al. | |

(Continued)

FOREIGN PATENT DOCUMENTS

TW 201642616 A 12/2016
TW 201642617 A 12/2016
(Continued)

OTHER PUBLICATIONS

Specification, U.S. Appl. No. 14/673,679, filed Mar. 30, 2015.
(Continued)

*Primary Examiner* — Maung T Lwin
(74) *Attorney, Agent, or Firm* — Carr & Ferrell LLP

(57) ABSTRACT

Systems and methods for improving analytics in a distributed network are described herein. An example system includes at least one processor, an analytics module, and a security policy module. The security policy module is operable to define a security policy. The security policy is executed by the processor on a network packet. Furthermore, the processor collects network information from the network packet. The analytics module is operable to analyze the network information with additional group information from the security policy. The analysis is used by the processor to generate the result. Based on the generated result, the security policy module updates the security policy.

16 Claims, 6 Drawing Sheets

(56) References Cited

U.S. PATENT DOCUMENTS

| | | | |
|---|---|---|---|
| 7,397,794 B1 | 7/2008 | Lacroute et al. | |
| 7,464,407 B2 | 12/2008 | Nakae et al. | |
| 7,467,408 B1 | 12/2008 | O'Toole, Jr. | |
| 7,475,424 B2 * | 1/2009 | Lingafelt | H04L 63/0227 |
| | | | 726/1 |
| 7,516,476 B1 | 4/2009 | Kraemer et al. | |
| 7,519,062 B1 | 4/2009 | Kloth et al. | |
| 7,620,986 B1 | 11/2009 | Jagannathan et al. | |
| 7,694,181 B2 | 4/2010 | Noller et al. | |
| 7,725,937 B1 | 5/2010 | Levy | |
| 7,742,414 B1 | 6/2010 | Iannaccone et al. | |
| 7,774,837 B2 | 8/2010 | McAlister | |
| 7,849,495 B1 | 12/2010 | Huang et al. | |
| 7,900,240 B2 | 3/2011 | Terzis et al. | |
| 7,904,454 B2 * | 3/2011 | Raab | G06F 21/6227 |
| | | | 707/733 |
| 7,996,255 B1 | 8/2011 | Shenoy et al. | |
| 8,051,460 B2 | 11/2011 | Lum et al. | |
| 8,112,304 B2 | 2/2012 | Scates | |
| 8,254,381 B2 * | 8/2012 | Allen | H04L 51/066 |
| | | | 370/351 |
| 8,259,571 B1 | 9/2012 | Raphel et al. | |
| 8,291,495 B1 | 10/2012 | Burns et al. | |
| 8,296,459 B1 | 10/2012 | Brandwine et al. | |
| 8,307,422 B2 | 11/2012 | Varadhan et al. | |
| 8,321,862 B2 | 11/2012 | Swamy et al. | |
| 8,353,021 B1 | 1/2013 | Satish et al. | |
| 8,369,333 B2 | 2/2013 | Hao et al. | |
| 8,396,986 B2 | 3/2013 | Kanada et al. | |
| 8,429,647 B2 | 4/2013 | Zhou | |
| 8,468,113 B2 | 6/2013 | Harrison et al. | |
| 8,490,153 B2 | 7/2013 | Bassett et al. | |
| 8,494,000 B1 * | 7/2013 | Nadkarni | H04L 43/028 |
| | | | 370/465 |
| 8,499,330 B1 * | 7/2013 | Albisu | H04L 63/10 |
| | | | 726/1 |
| 8,528,091 B2 | 9/2013 | Bowen et al. | |
| 8,565,118 B2 | 10/2013 | Shukla et al. | |
| 8,612,744 B2 * | 12/2013 | Shieh | H04L 63/0218 |
| | | | 713/153 |
| 8,661,434 B1 | 2/2014 | Liang et al. | |
| 8,677,496 B2 | 3/2014 | Wool | |
| 8,688,491 B1 | 4/2014 | Shenoy et al. | |
| 8,726,343 B1 | 5/2014 | Borzycki et al. | |
| 8,730,963 B1 | 5/2014 | Grosser, Jr. et al. | |
| 8,798,055 B1 | 8/2014 | An | |
| 8,813,169 B2 | 8/2014 | Shieh et al. | |
| 8,813,236 B1 | 8/2014 | Saha et al. | |
| 8,819,762 B2 | 8/2014 | Harrison et al. | |
| 8,898,788 B1 | 11/2014 | Aziz et al. | |
| 8,935,457 B2 | 1/2015 | Feng et al. | |
| 8,938,782 B2 | 1/2015 | Sawhney et al. | |
| 8,990,371 B2 | 3/2015 | Kalyanaraman et al. | |
| 9,009,829 B2 | 4/2015 | Stolfo et al. | |
| 9,015,299 B1 | 4/2015 | Shah | |
| 9,027,077 B1 | 5/2015 | Bharali et al. | |
| 9,036,639 B2 | 5/2015 | Zhang | |
| 9,060,025 B2 | 6/2015 | Xu | |
| 9,141,625 B1 | 9/2015 | Thornewell et al. | |
| 9,191,327 B2 | 11/2015 | Shieh | |
| 9,258,275 B2 | 2/2016 | Sun et al. | |
| 9,294,302 B2 | 3/2016 | Sun et al. | |
| 9,294,442 B1 | 3/2016 | Lian et al. | |
| 9,361,089 B2 | 6/2016 | Bradfield et al. | |
| 9,380,027 B1 | 6/2016 | Lian et al. | |
| 9,407,602 B2 | 8/2016 | Feghali et al. | |
| 9,521,115 B1 | 12/2016 | Woolward | |
| 9,609,083 B2 | 3/2017 | Shieh | |
| 9,621,595 B2 | 4/2017 | Lian et al. | |
| 9,680,852 B1 | 6/2017 | Wager et al. | |
| 9,762,599 B2 | 9/2017 | Wager et al. | |
| 10,009,317 B2 | 6/2018 | Woolward | |
| 10,009,381 B2 | 6/2018 | Lian et al. | |
| 10,091,238 B2 | 10/2018 | Shieh et al. | |
| 2002/0031103 A1 | 3/2002 | Wiedeman et al. | |
| 2002/0066034 A1 | 5/2002 | Schlossberg et al. | |
| 2003/0014665 A1 | 1/2003 | Anderson et al. | |
| 2003/0055950 A1 | 3/2003 | Cranor et al. | |
| 2003/0177389 A1 | 9/2003 | Albert et al. | |
| 2004/0062204 A1 | 4/2004 | Bearden et al. | |
| 2004/0095897 A1 | 5/2004 | Vafaei | |
| 2004/0172557 A1 | 9/2004 | Nakae et al. | |
| 2005/0021943 A1 | 1/2005 | Ikudome et al. | |
| 2005/0033989 A1 | 2/2005 | Poletto et al. | |
| 2005/0060573 A1 | 3/2005 | D'Souza | |
| 2005/0114829 A1 | 5/2005 | Robin et al. | |
| 2005/0190758 A1 * | 9/2005 | Gai | H04L 12/4645 |
| | | | 370/389 |
| 2005/0201343 A1 | 9/2005 | Sivalingham et al. | |
| 2005/0246241 A1 | 11/2005 | Irizarry, Jr. et al. | |
| 2005/0283823 A1 * | 12/2005 | Okajo | G06F 21/604 |
| | | | 726/1 |
| 2006/0005228 A1 | 1/2006 | Matsuda | |
| 2006/0037077 A1 | 2/2006 | Gadde et al. | |
| 2006/0050696 A1 | 3/2006 | Shah et al. | |
| 2006/0137009 A1 | 6/2006 | Chesla | |
| 2007/0016945 A1 | 1/2007 | Bassett et al. | |
| 2007/0019621 A1 | 1/2007 | Perry et al. | |
| 2007/0022090 A1 * | 1/2007 | Graham | G06F 21/55 |
| 2007/0064617 A1 | 3/2007 | Reves | |
| 2007/0079308 A1 | 4/2007 | Chiaramonte et al. | |
| 2007/0130566 A1 | 6/2007 | van Rietschote et al. | |
| 2007/0168971 A1 | 7/2007 | Royzen et al. | |
| 2007/0192861 A1 | 8/2007 | Varghese et al. | |
| 2007/0192863 A1 | 8/2007 | Kapoor et al. | |
| 2007/0198656 A1 | 8/2007 | Mazzaferri et al. | |
| 2007/0239987 A1 | 10/2007 | Hoole et al. | |
| 2007/0271612 A1 | 11/2007 | Fang et al. | |
| 2007/0277222 A1 | 11/2007 | Pouliot | |
| 2008/0016339 A1 | 1/2008 | Shukla | |
| 2008/0016550 A1 * | 1/2008 | McAlister | H04L 63/105 |
| | | | 726/1 |
| 2008/0083011 A1 | 4/2008 | McAlister et al. | |
| 2008/0086772 A1 | 4/2008 | Chesla | |
| 2008/0155239 A1 | 6/2008 | Chowdhury et al. | |
| 2008/0163207 A1 | 7/2008 | Reumann et al. | |
| 2008/0229382 A1 * | 9/2008 | Vitalos | H04L 63/0263 |
| | | | 726/1 |
| 2008/0239961 A1 * | 10/2008 | Hilerio | H04L 41/5009 |
| | | | 370/235 |
| 2008/0301770 A1 | 12/2008 | Kinder | |
| 2008/0307110 A1 | 12/2008 | Wainner et al. | |
| 2009/0077621 A1 | 3/2009 | Lang et al. | |
| 2009/0083445 A1 | 3/2009 | Ganga | |
| 2009/0103524 A1 | 4/2009 | Mantripragada et al. | |
| 2009/0138316 A1 | 5/2009 | Weller et al. | |
| 2009/0165078 A1 | 6/2009 | Samudrala et al. | |
| 2009/0182835 A1 | 7/2009 | Aviles et al. | |
| 2009/0190585 A1 * | 7/2009 | Allen | H04L 12/5835 |
| | | | 370/390 |
| 2009/0249470 A1 | 10/2009 | Litvin et al. | |
| 2009/0260051 A1 * | 10/2009 | Igakura | G06F 9/4825 |
| | | | 726/1 |
| 2009/0268667 A1 | 10/2009 | Gandham et al. | |
| 2009/0328187 A1 | 12/2009 | Meisel | |
| 2010/0043068 A1 | 2/2010 | Varadhan et al. | |
| 2010/0064341 A1 * | 3/2010 | Aldera | H04L 63/102 |
| | | | 726/1 |
| 2010/0071025 A1 | 3/2010 | Devine et al. | |
| 2010/0088738 A1 * | 4/2010 | Birnbach | G06F 21/604 |
| | | | 726/1 |
| 2010/0095367 A1 | 4/2010 | Narayanaswamy | |
| 2010/0125900 A1 | 5/2010 | Dennerline et al. | |
| 2010/0189110 A1 | 7/2010 | Kambhampati et al. | |
| 2010/0191863 A1 | 7/2010 | Wing | |
| 2010/0192223 A1 | 7/2010 | Ismael et al. | |
| 2010/0192225 A1 * | 7/2010 | Ma | G06F 17/30985 |
| | | | 726/23 |
| 2010/0199349 A1 | 8/2010 | Ellis | |
| 2010/0208699 A1 | 8/2010 | Lee et al. | |
| 2010/0228962 A1 | 9/2010 | Simon et al. | |
| 2010/0235880 A1 | 9/2010 | Chen et al. | |

(56) References Cited

U.S. PATENT DOCUMENTS

| | | |
|---|---|---|
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0075667 A1 | 3/2011 | Li et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0278903 A1* | 11/2012 | Pugh .................. G06F 21/604 726/28 |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324567 A1* | 12/2012 | Couto ................. H04L 41/0853 726/12 |
| 2013/0019277 A1 | 1/2013 | Chang et al. |
| 2013/0081142 A1 | 3/2013 | McDougal et al. |
| 2013/0086383 A1 | 4/2013 | Galvao de Andrade et al. |
| 2013/0086399 A1 | 4/2013 | Tychon et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0152187 A1 | 6/2013 | Strebe et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1* | 10/2013 | Macy .................. G06F 21/577 726/1 |
| 2013/0291088 A1 | 10/2013 | Shieh et al. |
| 2013/0298181 A1* | 11/2013 | Smith .................. H04L 61/2539 726/1 |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1* | 9/2014 | Moore .................. H04L 63/0236 726/22 |
| 2014/0298469 A1 | 10/2014 | Marion et al. |
| 2014/0310765 A1 | 10/2014 | Stuntebeck et al. |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1* | 5/2015 | Alvarez .................. H04L 45/46 370/235 |
| 2015/0163088 A1 | 6/2015 | Anschutz |
| 2015/0180894 A1* | 6/2015 | Sadovsky .............. G06F 3/0481 726/22 |
| 2015/0186296 A1 | 7/2015 | Guidry |
| 2015/0229641 A1 | 8/2015 | Sun et al. |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0191466 A1* | 6/2016 | Pernicha .................. H04L 63/20 726/1 |
| 2016/0191545 A1* | 6/2016 | Nanda .................. H04L 63/145 726/1 |
| 2016/0203331 A1* | 7/2016 | Khan .................. G06F 21/6245 726/1 |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2017/0005986 A1 | 1/2017 | Barisal et al. |
| 2017/0063795 A1 | 3/2017 | Lian et al. |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0279770 A1 | 9/2017 | Woolward et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0191779 A1 | 7/2018 | Shieh et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

Specification, U.S. Appl. No. 14/673,640, filed Mar. 30, 2015.
Specification, U.S. Appl. No. 14/677,827, filed Apr. 2, 2015.
Specification, U.S. Appl. No. 14/657,282, filed Mar. 13, 2015.
International Search Report dated May 3, 2016 in Patent Cooperation Treaty Application No. PCT/US2016/024116 filed Mar. 24, 2016.
International Search Report dated May 3, 2016 in Patent Cooperation Treaty Application No. PCT/US2016/024300 filed Mar. 25, 2016.
International Search Report dated May 3, 2016 in Patent Cooperation Treaty Application No. PCT/US2016/024053 filed Mar. 24, 2016.
International Search Report dated May 6, 2016 in Patent Cooperation Treaty Application No. PCT/US2016/019643 filed Feb. 25, 2016.
Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection.
Non-Final Office Action, dated Jul. 6, 2016, U.S. Appl. No. 15/151,303, filed May 10, 2016.
Final Office Action, dated Jul. 7, 2016, U.S. Appl. No. 14/877,836, filed Oct. 7, 2015.

(56) References Cited

OTHER PUBLICATIONS

Non-Final Office Action, dated Jul. 25, 2016, U.S. Appl. No. 15/090,523, filed Apr. 4, 2016.
Notice of Allowance, filed Jul. 27, 2016, U.S. Appl. No. 15/080,519, filed Mar. 24, 2016.
Non-Final Office Action, dated Sep. 16, 2016, U.S. Appl. No. 15/209,275, filed Jul. 13, 2016.
Non-Final Office Action, dated May 18, 2016, U.S. Appl. No. 14/964,318, filed Dec. 9, 2015.
International Search Report dated Jun. 20, 2016 in Patent Cooperation Treaty Application No. PCT/US2016/024310 filed Mar. 25, 2016, pp. 1-9.
"Feature Handbook: NetBrain® Enterprise Edition 6.1" NetBrain Technologies, Inc., Feb. 25, 2016, 48 pages.
Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.
"International Search Report" and "Written Opinion of the International Searching Authority," Patent Cooperation Treaty Application No. PCT/US2016/065451, dated Jan. 12, 2017, 20 pages.
Notice of Allowance, dated Nov. 17, 2016, U.S. Appl. No. 14/877,836, filed Oct. 7, 2015.
Notice of Allowance, dated Nov. 29, 2016, U.S. Appl. No. 15/151,303, filed May 10, 2016.
Final Office Action, dated Nov. 14, 2016, U.S. Appl. No. 14/964,318, filed Dec. 9, 2015.
Non-Final Office Action, dated Jan. 5, 2017, U.S. Appl. No. 15/348,978, filed Nov. 10, 2016.
Notice of Allowance, dated Feb. 1, 2017, U.S. Appl. No. 15/090,523, filed Apr. 4, 2016.
Maniar, Neeta, "Centralized Tracking and Risk Analysis of 3rd Party Firewall Connections," SANS Institute InfoSec Reading Room, Mar. 11, 2005, 20 pages.
Hu, Hongxin et al., "Detecting and Resolving Firewall Policy Anomalies," IEEE Transactions on Dependable and Secure Computing, vol. 9, No. 3, May/Jun. 2012, pp. 318-331.

* cited by examiner

METHODS AND SYSTEMS FOR IMPROVING ANALYTICS IN DISTRIBUTED NETWORKS

TECHNICAL FIELD

The present disclosure relates generally to data processing and, more particularly, to methods and systems for improving analytics in distributed networks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Cloud computing, virtualization, software defined networks, and mobility are transforming legacy data centers having a client-to-server traffic flow, sometimes referred to as "north-south," into data centers having server-to-server traffic flow, sometimes referred to as "east-west." East-west traffic may also include traffic that travels between servers in different data centers. Due to the traffic volume or complexity of client requests, client requests may not be serviced by a single server. East-west architecture of data centers may enable data assets to be advantageously positioned in different locales, both inside and outside the enterprise premises. However, traditional perimeter security solutions often fail and cannot adequately protect the data centers from attackers.

An enterprise may attempt to analyze network traffic travelling between its servers. However, any analysis is normally limited to monitoring network traffic volume and determining trends in the traffic flow in order to discover malicious activities. Notably, the network traffic volume does not provide much contextual data with regards to the network environment. Therefore, attackers may find ways past the traditional perimeters by attacking low profile assets and then moving laterally across the data center to important enterprise assets to compromise enterprise and customer data.

Additionally, any correlations between hosts cannot be determined based solely on the network traffic volume.

SUMMARY

This summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter.

Provided are systems and methods for improving analytics in a distributed network. An example method may commence with defining a security policy. The security policy may include a firewall security policy, but is not limited to this embodiment. The security policy may be associated with at least one host or one group. The security policy may be executed to determine action against a network packet. The method may further include collecting network information from the network packets. The network information may be generated based on log information associated with the at least one host or one group. The network information may be analyzed with additional group information from the security policy. The analysis may include analyzing network packets inside the at least one group, analyzing network packets traveling between two or more hosts or groups, and analyzing connections between the two or more hosts or groups. Based on the analysis, Domain Name Server (DNS) information for the network packet may be determined. Based on the DNS information, it may be determined whether a Domain Generation Algorithm (DGA) has been used to generate a domain name of a domain associated with the network packet. Based on log information associated with at least one group, the log information may be checked for security threats. Furthermore, the method may include generating a result from the analysis. Based on the generated result, the security policy may be updated. Updating of the security policy may include applying actions (e.g., permit or deny a connection), rearranging at least one group (for example, moving hosts between groups) and modifying security system parameters for the at least one group. The updating may further include generating an enforcement policy associated with at least one group, applying a packet capture (PCAP) to analyze contents of the network packet associated with the at least one group, and modifying a monitoring policy associated with the at least one group.

Also provided is a system for improving analytics in a distributed network. The system may comprise at least one processor, an analytics module, and a security policy module. The security policy module may be operable to define a security policy. The security policy may be associated with at least one group having at least one host. The security policy may be executed by the processor to inspect a network packet.

Furthermore, the processor may collect network information from the network packets. The analytics module may be operable to analyze the network information with additional group information from the security policy. The analysis may include determining DNS information for the network packet, based on the DNS information; determining whether a DGA has been used to generate a domain name of a domain associated with the network packet; and, based on log information associated with at least one group, analyzing the network information for security threats. The analysis may be used by the processor to generate a result. Based on the generated result, the security policy module may update the security policy. The updating may include generating an enforcement policy associated with at least one group, collecting packet capture of the network packet associated with at least one group, and modifying a monitoring policy associated with the at least one group.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
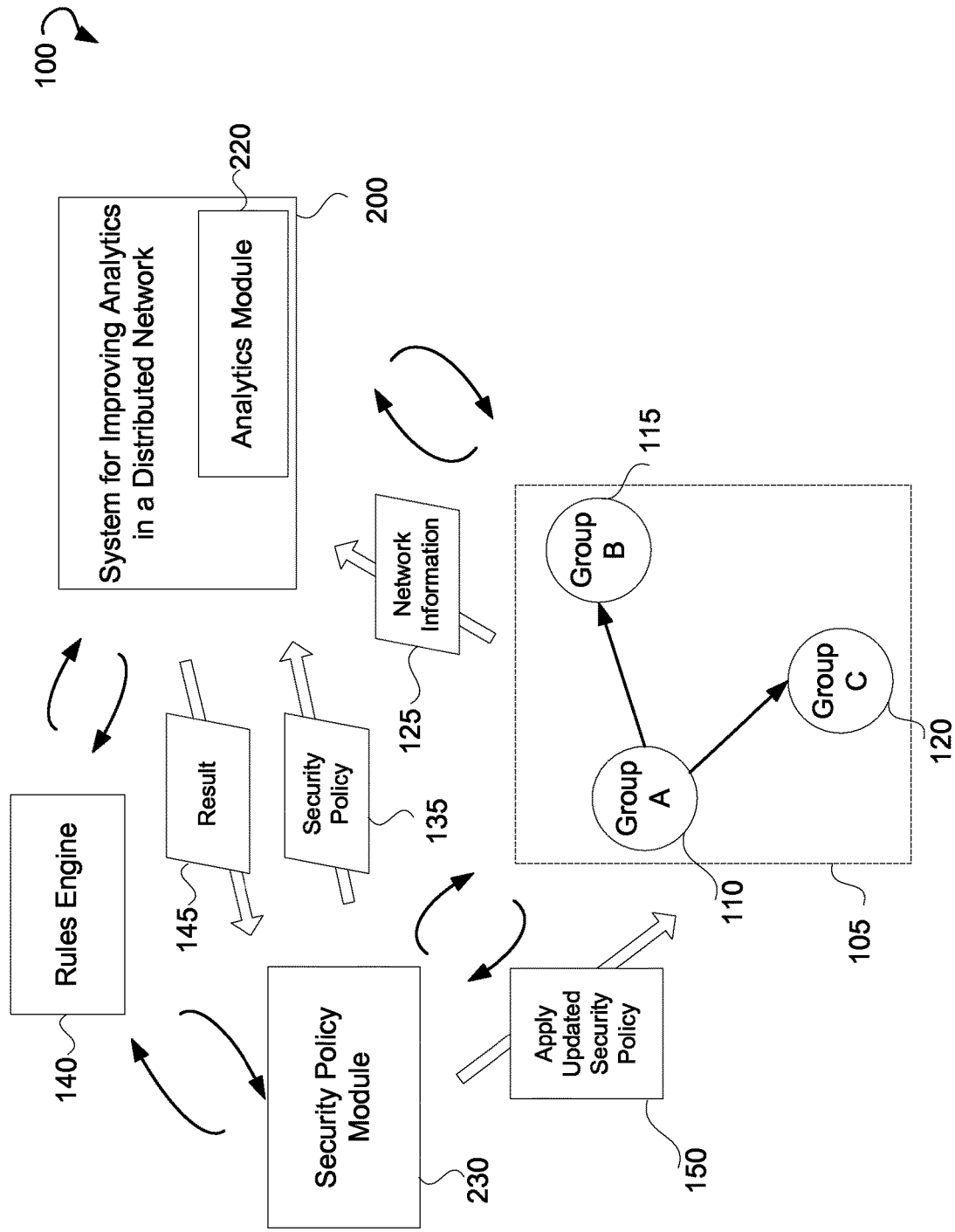
FIG. 1 illustrates an environment within which systems and methods for improving analytics in a distributed network can be implemented, in accordance with some embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

This disclosure provides methods and systems for improving analytics in a distributed network. A distributed network is a type of computer network, in which enterprise infrastructure resources are divided over a number of networks, processors, and intermediary devices. For the east-west traffic architecture, the network traffic may be spread out over a plurality of virtual machines (e.g., servers or hosts) and physical hosts inside the distributed network. As used herein, "host" refers to any computer connected to the distributed network.

The methods and systems of the present disclosure may allow integrating a security system, a security policy, and security analytics. More specifically, every network packet sent between hosts can be inspected by a security policy module. The security policy module may set a security policy for each host or a group of hosts. Generally, the security policy may include a set of rules directed to protecting information technology assets of a system, organization, or other entity. The security policy may define access control lists between address groups, where address groups are mostly groups of hosts with similar security attributes or functions, such as address groups for File Transfer Protocol (FTP) or Web/Hypertext Transfer Protocol (HTTP) servers.

The methods and systems of the present disclosure may import group information (for example, security attributes of the hosts) to group hosts together from a security system (or an enforcement module) and to utilize the group information for security analytics. More specifically, an analytics module may analyze intra-group network information, which relates to network packets travelling between the hosts of the same group, using an analytics model to correlate with the security system security policies related to the network packets. During the analysis, the analytics module can find inconsistent patterns in the network information related among hosts of a same address group, thus detecting the invasion. Based on the result of the analysis, the analytics module may send feedback to the security policy module. The feedback may include, for example, similar patterns in the network information. Based on the feedback received from the analytics module and correlation of security attributes related to the hosts, the security policy module may update the current security policy related to the hosts to perform deep packet inspection to retrieve more information for analysis, or block all network connections to a specific host if it detects malware infection of the host.

Additionally, the analytics module may analyze inter-group network information related to network packets travelling between hosts belonging to different groups. Based on the analysis and similar patterns found in the network information, the updated security policy may be generated, according to which some hosts of different groups may be regrouped. For example, the network information related to hosts of Group A and Group B may be analyzed, and based on the analysis of the network information and correlation of the security parameters, the hosts of Group A may be grouped together with some hosts of Group B into Group C. The hosts of Group C may have similar patterns in the network information, and a uniform security policy may be applied to the hosts of Group C.

FIG. 1 illustrates an environment 100 within which systems and methods for improving analytics in a distributed network can be implemented, in accordance with some embodiments. The environment 100 may include a virtualized environment in a distributed network (not shown), in which network traffic may travel between hosts 105. The hosts 105 may include any computers, servers, virtual machines, and the like of the distributed network. The hosts 105 may be grouped into groups, shown as a group A 110, a group B 115, and a group C 120. A system 200 for improving analytics in a distributed network may collect network information 125 related to the hosts 105 and network packets travelling between the hosts 105. A security policy module 230 may provide the system 200 with a security policy 135 related to the hosts 105. The security policy module 230 may communicate with analytics module 220 to check rules for applications associated with or running on hosts 105. The analytics module 220 may also analyze the network information 125 correlated with the security policy 135. Based on the analysis, the analytics module 220 may send a result 145 of the analysis to the security policy module 230. The security policy module 230 may use the result 145 to generate an updated security policy and apply the updated security policy 150 to the hosts 105. Application of the updated security policy is described further in related U.S. patent application Ser. No. 14/673,640, filed Mar. 30, 2015, entitled "Conditional Declarative Policies."

Figure 2:
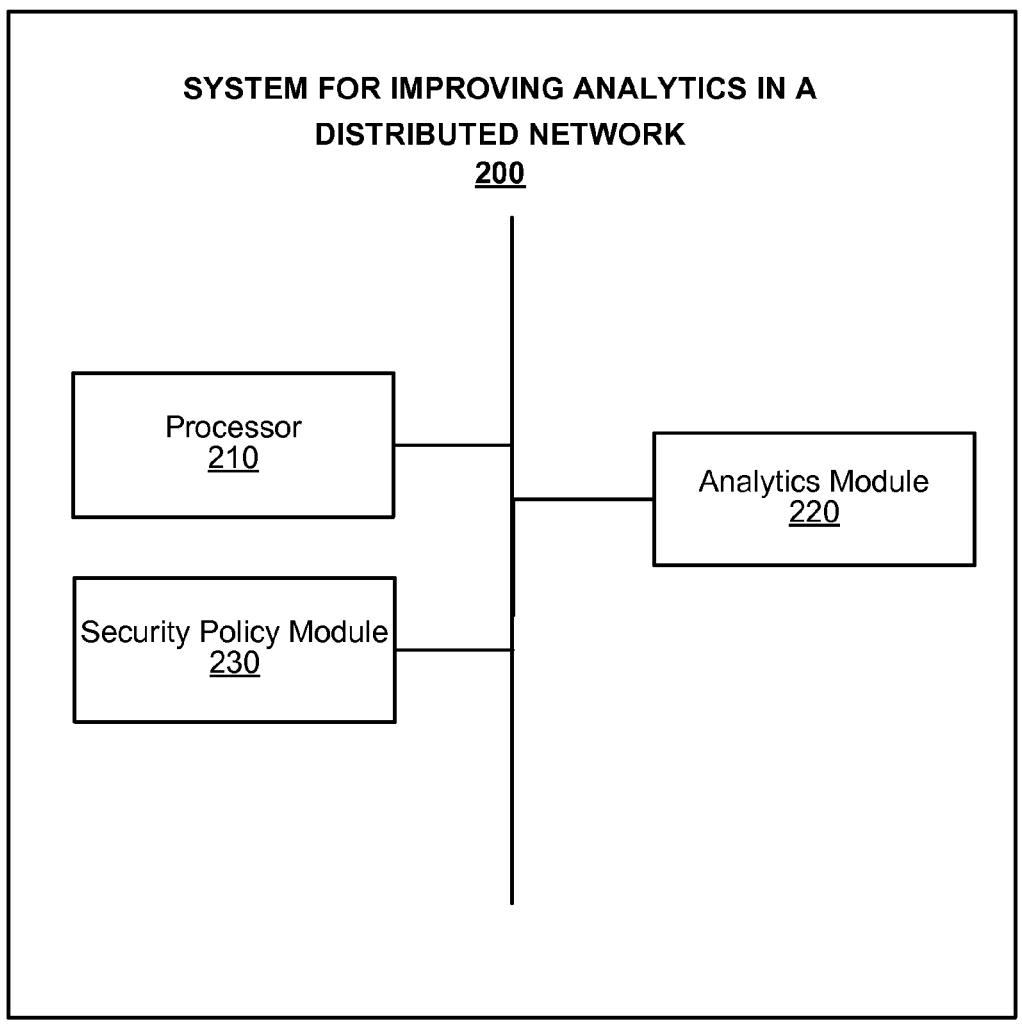
FIG. 2 is a block diagram showing various modules of a system for improving analytics in a distributed network, in accordance with certain embodiments.

FIG. 2 is a block diagram showing various modules of a system 200 for improving analytics in a distributed network, in accordance with certain embodiments. The system may comprise a processor 210, an analytics module 220, a security policy module 230, and one or more enforcement points. The processor 210 may include a programmable processor, such as a microcontroller, central processing unit, and so forth. In other embodiments, the processor 210 may include an application-specific integrated circuit or programmable logic array, such as a field programmable gate array, designed to implement the functions performed by the system. In various embodiments, the system 200 may reside outside an organization in a data center outside control of the organization and be provided as a cloud service.

The processor 210 may be operable to execute a security policy on a network packet. In an example embodiment, the processor 210 receives the security policy from the security policy module 230. In an example embodiment, the security policy is associated with at least one group, which includes at least one host. In a further example embodiment, the group includes a plurality of servers.

The processor 210 may be further operable to generate network information related to the network packet. In an example embodiment, the generating of the network information is based on log information associated with at least one group. In another example embodiment, the log information is stored in an indexed database (not shown). The index database may be operable to log and index the network information related to network packets. Furthermore, the processor 210 may be operable to generate a result from an analysis performed by the analytics module 220.

In an example embodiment, the result may include determining that the domain associated with the network packet is valid. In other embodiments, the result may include determining that the domain associated with the network packet is invalid. Moreover, the result may include determining that the domain associated with the network packet requires an elevated scrutiny. The elevated scrutiny may include collecting packet capture (PCAP) associated with the domain. A PCAP may consist of an application programming interface for capturing network traffic. Therefore, a PCAP may be a process of intercepting and logging network traffic.

In an example embodiment, the processor 210 may be operable to extract group information from the security policy. The group information may include group security attributes associated with the at least one group.

The analytics module 220 may be operable to analyze the network information. The analytics module 220 may receive the network information from the processor 210. The analysis may be performed using analytics module 220 correlated with the security policy.

In an example embodiment, during the analysis, the analytics module 220 may analyze data packets inside the at least one group or analyze data packets between two or more groups. Furthermore, the analytics module 220 may analyze connections between the two or more groups.

By way of further non-limiting example, the analysis may include determining DNS information for the network packet. Based on the DNS information, the analytics module 220 may determine if a DGA is used to generate a domain name of a domain associated with the network packet. Additionally, based on log information associated with at least one group, the analytics module 220 may check the network information for security threats.

The security policy module 230 may be operable to define the security policy. In an example embodiment, the security policy module 230 sends the security policy to the processor 210. The security policy module 230 may be further operable to update the security policy based on the result generated by the analytics module 220. In an example embodiment, the updating may include rearranging at least one group. The rearranging of the group may include moving hosts between groups. In other words, hosts belonging to different groups may be grouped into a single group. Security policy module 230 is described further in related U.S. patent application Ser. No. 14/673,640, filed Mar. 30, 2015, entitled "Conditional Declarative Policies."

In a further example embodiment, the updating of the security policy may include modifying security system parameters for the at least one group. Additionally, the updating may include generating an enforcement policy associated with at least one group. In further embodiments, the updating includes modifying a monitoring policy to perform packet capture to further analyze contents of the network packet associated with the at least one host or one group.

One or more enforcement points intercept and analyze network traffic. One or more enforcement points are described in related U.S. patent application Ser. No. 14/657,282, filed Mar. 13, 2015, entitled "Methods and Systems for Providing Security to Distributed Microservices," which is hereby incorporated by reference in its entirety.

Figure 3:
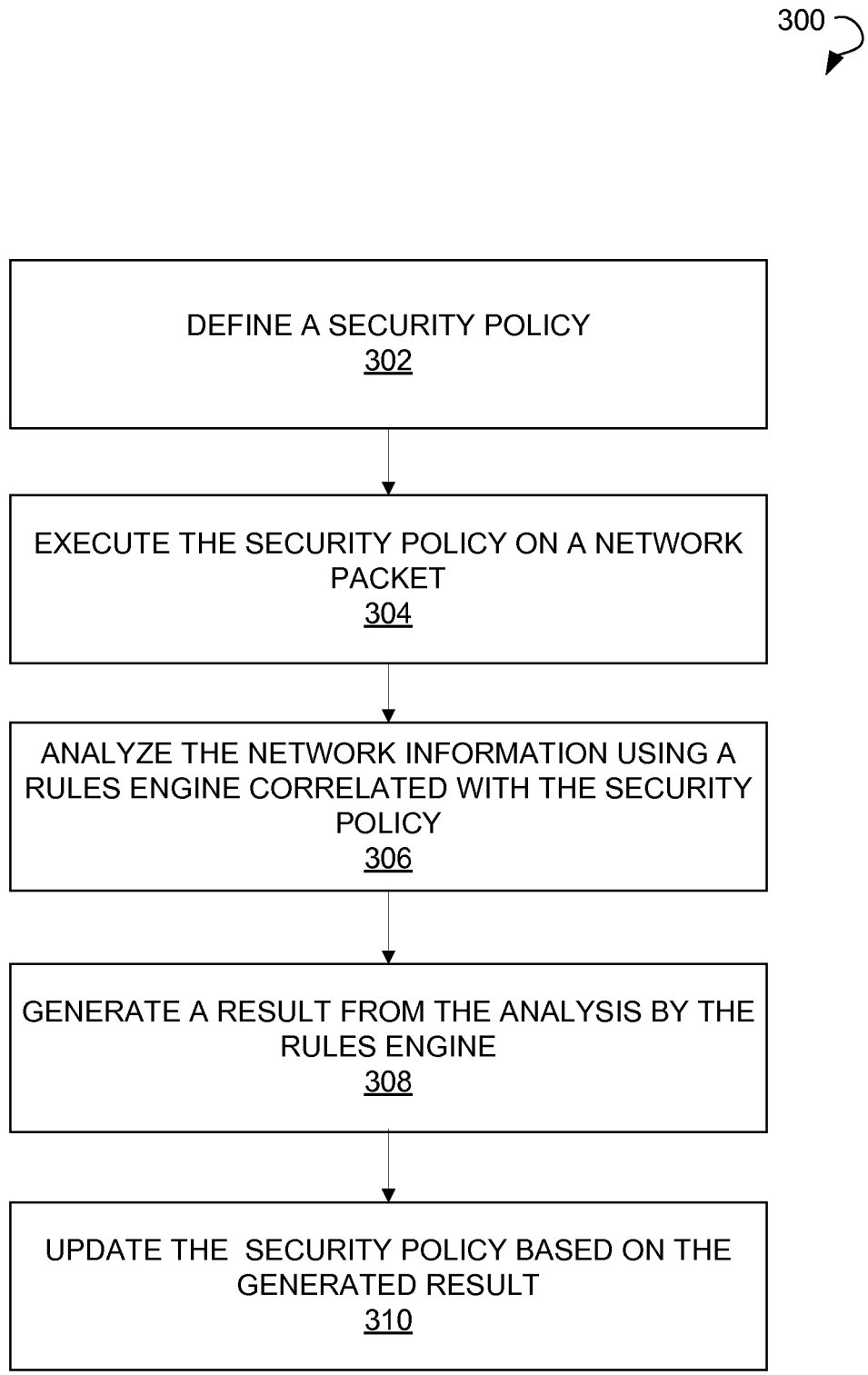
FIG. 3 is a flow chart illustrating a method for improving analytics in a distributed network, in accordance with some example embodiments.

FIG. 3 is a flow chart illustrating a method 300 for improving analytics in a distributed network, in accordance with some example embodiments. The method 300 may commence with defining a security policy at operation 302. The security policy may be associated with at least one group. The at least one group may include at least one host, at least one server, and the like. Optionally, the method 300 may include extracting group information from the security policy. The group information may include group security attributes associated with the at least one group.

Upon defining the security policy, the security policy may be executed on a network packet and information related to the network packet may be generated at operation 304. The network information may be analyzed at operation 306. In an example embodiment, the analyzing may include analyzing data packets inside the at least one group and analyzing data packets between two or more groups. Additionally, connections between the two or more groups may be analyzed.

By way of non-limiting example, analyzing may further include determining DNS information for the network packet. Based on the DNS information, it may be determined if a DGA is used to generate a domain name of a domain associated with the data packet. In further embodiments, the analyzing includes checking the network information for security threats based on log information associated with at least one group.

The analyzing may be performed using an analytics module with domain info extracted from security policy. The analysis may include generating a result. The result may include determining that the domain associated with the network packet is valid. In a further embodiment, the result may include determining that the domain associated with the network packet is invalid. Furthermore, the result may include determining that the domain associated with the network packet requires an elevated scrutiny. The elevated scrutiny may imply applying a PCAP to further network packets associated with the domain.

At operation 308, in response to a determination that elevated scrutiny is not needed, a policy is added to quarantine the infected host or group. At operation 310, the security policy is optionally updated.

At operation 308, in response to a determination that elevated scrutiny is needed, a policy is added to perform deep packet inspection and/or collect PCAP. At operation 310, the security policy is optionally updated.

In an example embodiment, the updating includes rearranging at least one group. The rearranging may include moving hosts between groups. The updating may further include modifying security system parameters for the at least one group.

In further example embodiments, the updating includes generating an enforcement policy associated with at least one group. In case the domain is determined to be invalid, all network packets coming from an invalid domain may be blocked. Furthermore, in the course of the updating, PCAP may be applied to analyze contents of the network packet associated with the at least one group. The updating may further result in modifying a monitoring policy associated with the at least one group.

Figure 4:
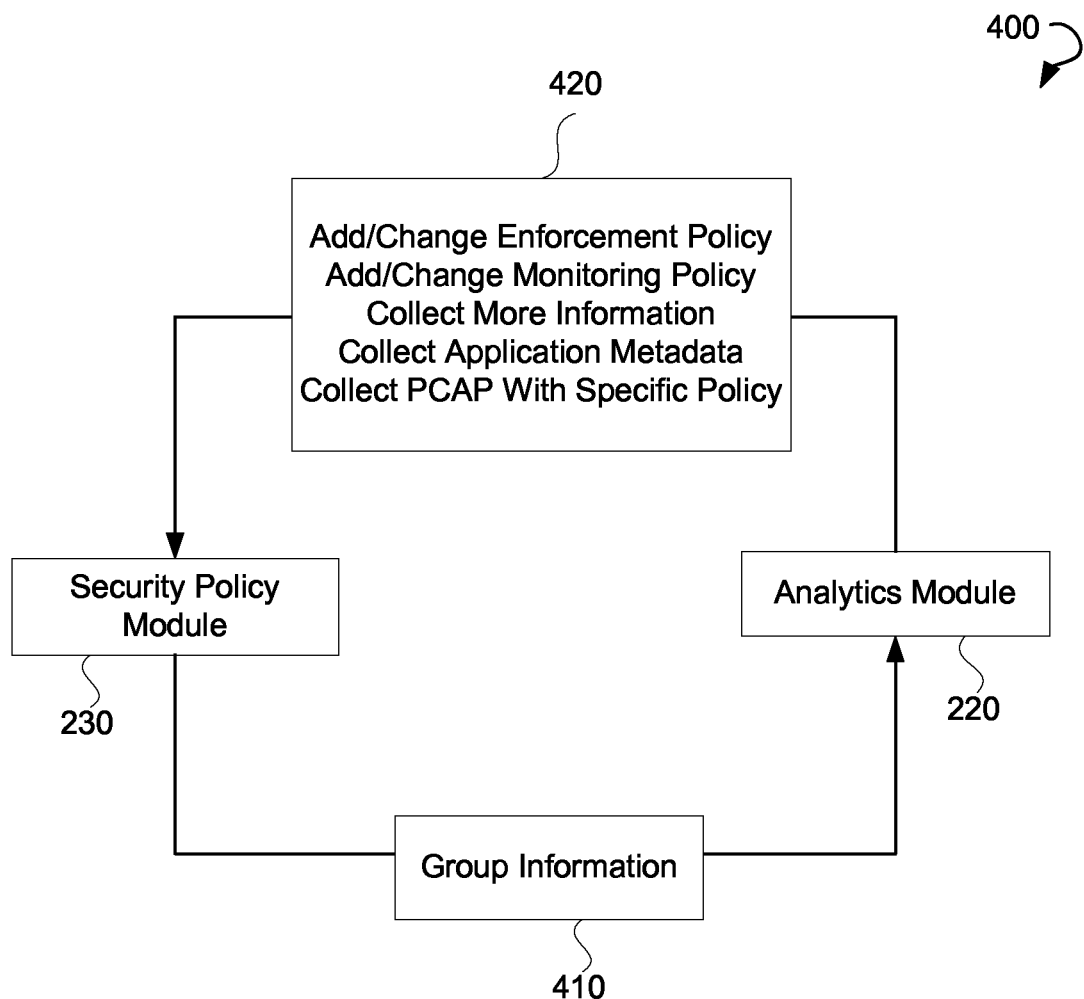
FIG. 4 shows a schematic diagram of interactions between a security policy module and an analytics module, in accordance with an example embodiment.

FIG. 4 shows a schematic diagram 400 of interaction between a security policy module 230 and an analytics module 220, according to an example embodiment. The security policy module 230 may collect and provide group information 410 to the analytics module 220. The group information 410 may be intra-group information (i.e., may relate to hosts of the same group) or inter-group information (i.e., may relate to hosts of different groups). Based on the group information 410 received from the security policy module 230, the analytics module 220 may perform an analysis and provide a result 420 of the analysis to the security policy module 230. The result 420 may include rules to be included, changed, or updated in a security policy related to the hosts. For example, the rules may include adding or changing an enforcement policy related to the hosts or a domain associated with the hosts, adding or changing a monitoring policy related to the hosts or the domain associated with the hosts, collecting PCAP with a specific policy, collecting more information related to the hosts or the domain associated with the hosts, such as metadata of an application associated with the host, and so forth.

Figure 5:
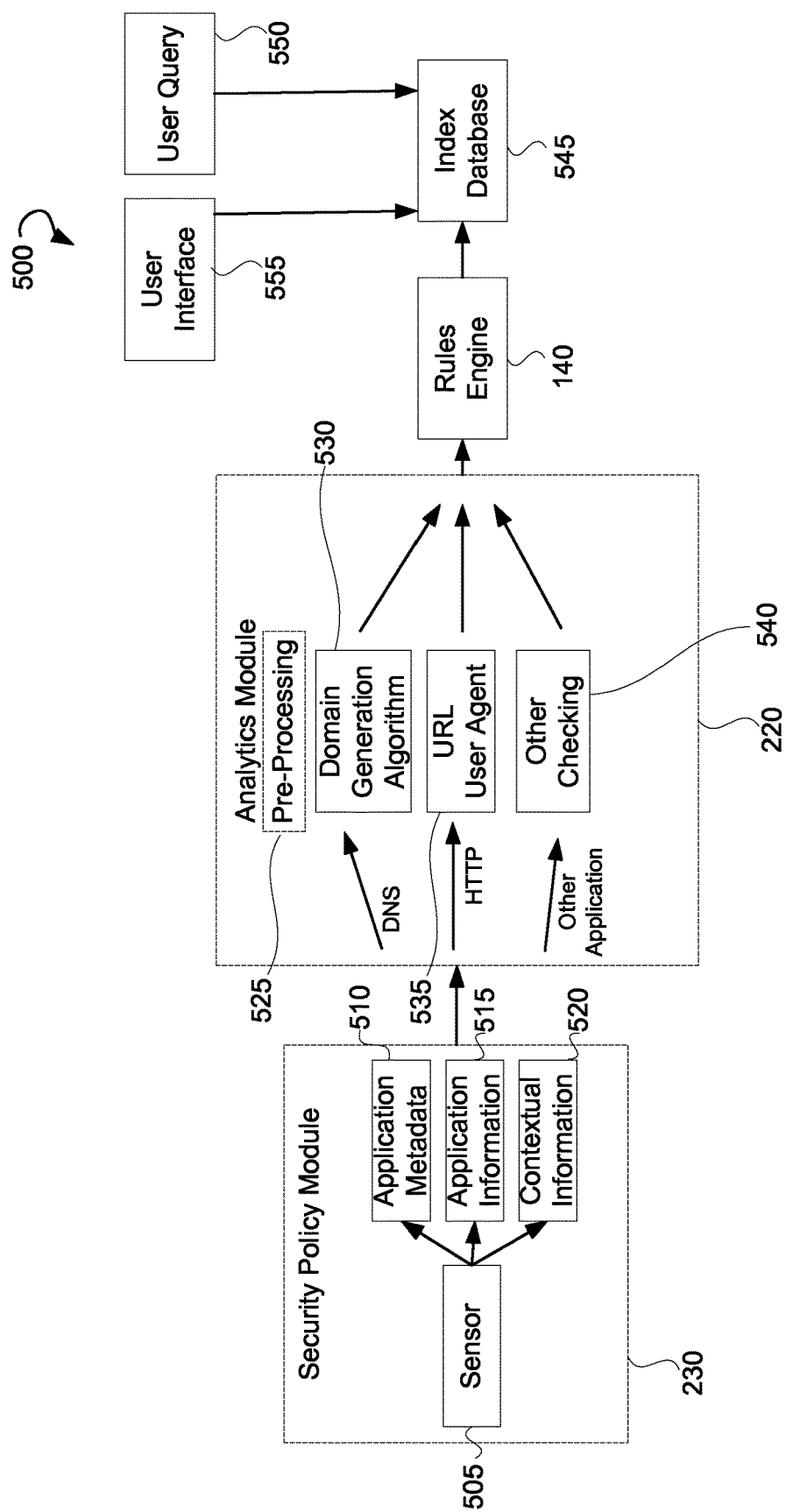
FIG. 5 shows a schematic diagram of analytics performed by a system for improving analytics in a distributed network, in accordance with an example embodiment.

FIG. 5 shows a schematic diagram 500 of analytics performed by a system for improving analytics in a distributed network, according to an example embodiment. The security policy module 230 may include a sensor 505. The sensor 505 may collect at least one of application metadata 510, application information 515, some contextual information 520 related to an application associated with the hosts in a distributed network, and the like. The sensor 505 may provide the collected information to the analytics module 220. The analytics module 220 may perform pre-processing 525 of the information received from the sensor 505. The analytics module 220 may check rules for different applications. More specifically, the analytics module 220 may analyze the network packets to detect malicious activity. For example, in a case of receiving a DNS related to the network packet, the analytics module 220 may check whether a Domain Generation Algorithm (DGA) 530 is used to generate a domain name of a domain associated with a network packet sent by the host. For a Hypertext Transfer Protocol (HTTP) request, a Uniform Resource Locator (URL) User Agent 535 may be checked. Typically, the URL User Agent 535 is software used by HTTP to identify software or an application originating the request or network packet. Other checking 540 may be performed with regard to information related to other applications.

The analytics module 220 may put the results of analysis into an index database 545, in which all information related to applications and analysis performed by the analytics module 220 may be logged and indexed. A user query 550 may be directed to the index database 545 and may be duly processed based on the indexed information contained in the index database 545 and visualized to a user using a user interface 555.

The example procedure of generating a feedback by an analytics module to a security system security module may include the following steps. The analytics module 220 may have all information related to the network traffic inside a distributed network. All information related to the network traffic may be logged. For example, the analytics module 220 may receive information related to the DNS associated with the network packet. The DNS may provide DNS connection information. An example security policy may prescribe group A to communicate with group B. The query communicated from group A to group B may be a domain 'ABC.com' request. A domain 'ABC.com' reply may be '1.1.1.1'.

Upon receiving all network information, the analytics module 220 may check if the domain is associated with a security threat, such as malware. For example, the analytics module 220 may check a blacklist to verify whether malicious behaviors of the domain were previously identified or whether the domain is present in a list of domains associated with malware. Additionally, as the Domain Generation Algorithm 530 is usually used to generate domains on the spot, the analytics module 220 may check if the domain name is similar to domain names that can be generated by the Domain Generation Algorithm 530. Such checking may result in a false positive; therefore, the analytics module 220 may perform additional checking and verify whether the query related to domain is valid or invalid.

If it is determined that a DNS query related to domain 'ABC.com' is invalid, the security policy module may update the security policy related to group D associated with the DNS query related to domain 'ABC.com.' For example, an enforcement policy with regard to group D may be generated. The updated security policy may include blocking any further network packets from group D.

If it cannot be determined whether the DNS query related to domain 'ABC.com' is valid or invalid, an elevated scrutiny may be applied to the domain. For example, a PCAP may be applied to further network packets associated with the group D. In this way, further information may be collected about suspicious connections.

Figure 6:
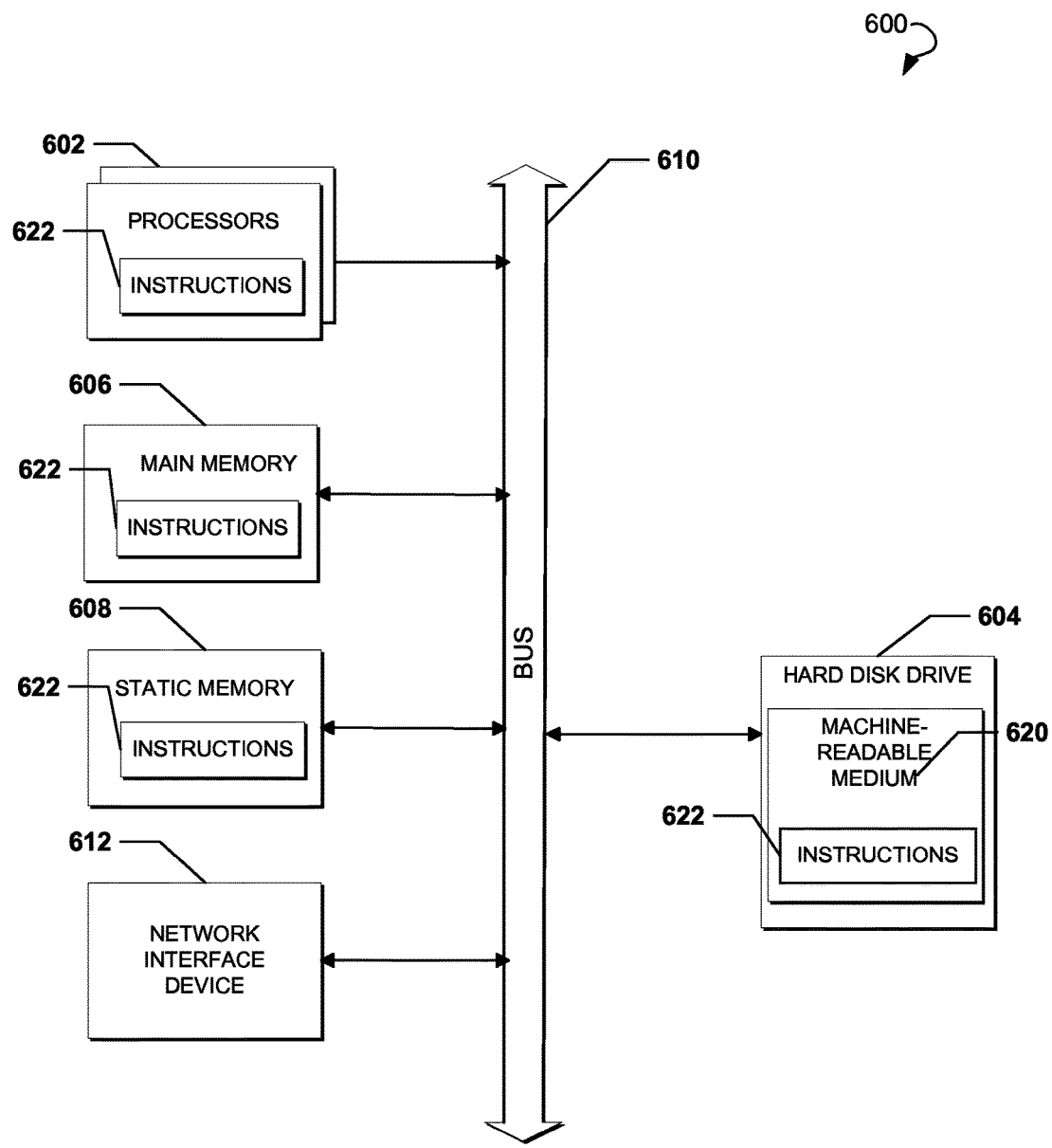
FIG. 6 shows a diagrammatic representation of a computing device for a machine in the exemplary electronic form of a computer system, within which a set of instructions for causing the machine to perform any one or more of the methodologies discussed herein, can be executed.

FIG. 6 shows a diagrammatic representation of a computing device for a machine in the exemplary electronic form of a computer system 600, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box (STB), a PDA, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602, a hard disk drive 604, a main memory 606 and a static memory 608, which communicate with each other via a bus 610. The computer system 600 may also include a network interface device 612. The hard disk drive 604 may include a computer-readable medium 620, which stores one or more sets of instructions 622 embodying or utilized by any one or more of the methodologies or functions described herein. The instructions 622 can also reside, completely or at least partially, within the main memory 606 and/or within the processor(s) 602 during execution thereof by the computer system 600. The main memory 606 and the processor(s) 602 also constitute machine-readable media.

While the computer-readable medium 620 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random-Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

Thus, systems and methods for improving analytics in a distributed network are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for improving analytics in a distributed network, the system comprising:
 a hardware processor executing instructions stored in memory, the instructions comprising:
  executing a security policy on a network packet;
  collecting network information from the network packet;
  generating a result from an analysis;
  analyzing the network information with additional group information from the security policy, the analyzing including examining communications including network packets between at least some hosts in a group, the analyzing further including identifying patterns indicative of malicious activity in the communications;
  in response to the analyzing, defining a second security policy, the second security policy applying to the group, each host of the group having a similar security attribute associated with group security attributes of the group;
  updating the security policy based on the generated result, the updating the security policy including at least one of:
   performing deep packet inspection on the communications, and
   blocking network communications to an infected host in the group;
  collecting at least one of application metadata, application information, and contextual information related to an application associated with another host in the group; and
  providing the collected information; wherein analyzing the network information correlated with the security policy includes:
   analyzing network packets between a first host in the group and a second host in the group;
   analyzing network packets between a third host in the group and a fourth host in a second group; and
   analyzing connections between the group and the second group;
  wherein the network information from the network packets regarding a current state of the distributed network is dynamic and changing over time.

2. The system of claim 1, wherein the the instructions further comprise extracting group information from the security policy, the group information including the group security attributes associated with the group.

3. The system of claim 1, wherein the updating the security policy based on the generated result includes:
 permitting or denying a connection; and
 modifying security system parameters for the group.

4. The system of claim 1, wherein the analyzing the network information correlated with the security policy includes at least one of the following:
 determining Domain Name Server (DNS) information for the network packet;
 based on the DNS information, determining if a Domain Generation Algorithm (DGA) was used to generate a domain name of a domain associated with the network packet; and
 based on log information associated with the group, checking the network information for security threats.

5. The system of claim4, wherein the result includes at least one of the following:
 determining that the domain associated with the network packet is valid;
 determining that the domain associated with the network packet is invalid; and
 determining that the domain associated with the network packet requires an elevated scrutiny.

6. The system of claim 5, wherein the elevated scrutiny includes applying a packet capture (PCAP) to further network packets associated with the domain.

7. The system of claim 1, wherein the generating of the result related to the network packet is based on log information associated with the group.

8. The system of claim 1, wherein the updating the security policy based on the generated result includes one or more of the following:
 generating an enforcement policy associated with the group;
 collecting Packet Capture (PCAP) to analyze contents of the network packet associated with the group; and
 modifying a monitoring policy associated with the group.

9. A method for improving analytics in a distributed network, the method comprising:
  defining a security policy, the security policy applying to a group, each host of the group having a similar security attribute associated with group security attributes of the group;
  executing the security policy on a network packet;
  collecting network information from the network packet;
  analyzing the network information with additional group information from the security policy, the analyzing including examining communications including network packets between at least some hosts in the group, the examining including identifying patterns indicative of malicious activity in the communications;
  generating a result from the analysis;
  updating the security policy based on the generated result, the updating the security policy including at least one of:
    performing deep packet inspection on the communications, and
    blocking network communications to an infected host in the group;
  collecting at least one of application metadata, application information, and contextual information related to an application associated with another host in the group; and
  providing the collected information for the analysis; wherein the analyzing the network information includes:
    analyzing network packets between a first host in the group and a second host in the group;
    analyzing network packets between a third host in the group and a fourth host in a second group; and
    analyzing connections between the group and the second group;
  wherein the network information from the network packets regarding a current state of the distributed network is dynamic and changing over time.

10. The method of claim 9, further comprising extracting group information from the security policy, the group information including the group security attributes associated with the group.

11. The method of claim 9, wherein the updating the security policy includes:
  permitting or denying a connection; and
  modifying security system parameters for the group.

12. The method of claim 9, wherein the analyzing includes at least one of the following:
  determining Domain Name System (DNS) information for the network packet;
  based on the DNS information, determining if a Domain Generation Algorithm (DGA) was used to generate a domain name of a domain associated with the network packet; and
  based on log information associated with the group, checking the network information for security threats.

13. The method of claim 12, wherein the result includes at least one of the following:
  determining that the domain associated with the network packet is valid;
  determining that the domain associated with the network packet is invalid; and
  determining that the domain associated with the network packet requires an elevated scrutiny.

14. The method of claim 13, wherein the elevated scrutiny includes applying a packet capture (PCAP) to further network packets associated with the domain.

15. The method of claim 9, wherein the updating the security policy includes one or more of the following:
  generating an enforcement policy associated with the group;
  collecting Packet Capture (PCAP) to analyze contents of the network packet associated with the group; and
  modifying a monitoring policy associated with the at least one group.

16. A system for improving analytics in a distributed network, the system comprising:
  a hardware processor executing instructions stored in memory, the instructions comprising:
    executing a security policy on a network packet, wherein the security policy is associated with a group;
    collecting network information from the network packet;
    generating a result from an analysis;
    performing the analysis, the analysis including analyzing the network information with additional group information from the security policy, the analyzing including examining communications including network packets between at least some hosts in a group, the analyzing further including identifying patterns indicative of malicious activity in the communications, wherein the analyzing includes at least one of:
      determining Domain Name System (DNS) information for the network packet;
      based on the DNS information, determining if a Domain Generation Algorithm (DGA) was used to generate a domain name of a domain associated with the network packet; and
      based on log information associated with at least one group, checking the network information for security threats;
    defining the security policy, the security policy applying to the group, each host of the group having a similar security attribute associated with group security attributes of the group;
    updating the security policy based on the generated result, wherein the updating includes at least one of:
      performing deep packet inspection on the communications;
      blocking network communications to an infected host in the group;
      generating an enforcement policy associated with the group;
      applying Packet Capture (PCAP) to analyze contents of the network packet associated with at least one group; and
      modifying a monitoring policy associated with the group;
    collecting at least one of application metadata, application information, and contextual information related to an application associated with another host in the group; and
    providing the collected information; wherein analyzing the network information correlated with the security policy includes:
      analyzing network packets between a first host in the group and a second host in the group;
      analyzing network packets between a third host in the group and a fourth host in a second group; and
      analyzing connections between the group and the second group; wherein the network information from the network packets regarding a current state of the distributed network is dynamic and changing over time.

* * * * *